(12) United States Patent
Okazaki

(10) Patent No.: US 10,250,074 B2
(45) Date of Patent: Apr. 2, 2019

(54) POWER SUPPLY SYSTEM

(71) Applicant: SII Semiconductor Corporation, Chiba-shi, Chiba (JP)

(72) Inventor: Norihiro Okazaki, Chiba (JP)

(73) Assignee: ABLIC INC., Chiba (JP)

( * ) Notice: Subject to any disclaimer, the term of this patent is extended or adjusted under 35 U.S.C. 154(b) by 245 days.

(21) Appl. No.: 15/163,169

(22) Filed: May 24, 2016

(65) Prior Publication Data

US 2016/0352150 A1    Dec. 1, 2016

(30) Foreign Application Priority Data

May 27, 2015  (JP) ................................ 2015-107604

(51) Int. Cl.
| | | |
|---|---|---|
| H01F 27/42 | (2006.01) | |
| H01F 37/00 | (2006.01) | |
| H01F 38/00 | (2006.01) | |
| H02J 50/12 | (2016.01) | |
| H02M 3/338 | (2006.01) | |
| H02J 7/00 | (2006.01) | |

(52) U.S. Cl.
CPC .......... H02J 50/12 (2016.02); H02M 3/3385 (2013.01); H02J 7/0029 (2013.01); *Y02B 70/1433* (2013.01)

(58) Field of Classification Search
CPC ...... H02J 50/12; H02J 7/0029; H02M 3/3385; Y02B 70/1433
See application file for complete search history.

(56) References Cited

U.S. PATENT DOCUMENTS

| | | | | |
|---|---|---|---|---|
| 2009/0086873 A1* | 4/2009 | Obata | ............... | G01R 31/31709 375/371 |
| 2011/0101791 A1* | 5/2011 | Urano | .................... | H02J 5/005 307/104 |
| 2011/0140863 A1* | 6/2011 | Shingai | ................ | G06K 7/0008 340/10.6 |
| 2011/0221438 A1* | 9/2011 | Goodwill | ............... | G01R 33/10 324/301 |
| 2013/0059533 A1* | 3/2013 | Kwon | .................. | H04B 5/0037 455/41.1 |
| 2014/0015332 A1* | 1/2014 | Miwa | ...................... | H01F 38/14 307/104 |
| 2014/0184154 A1 | 7/2014 | Okazaki | | |
| 2015/0028803 A1* | 1/2015 | Shevde | ................. | H02J 7/0052 320/108 |

(Continued)

FOREIGN PATENT DOCUMENTS

JP    2014-131440 A    7/2014

*Primary Examiner* — Alfonso Perez Borroto
*Assistant Examiner* — Esayas G Yeshaw
(74) *Attorney, Agent, or Firm* — Brinks Gilson & Lione

(57) ABSTRACT

To prevent an overvoltage from being applied to a load in a power reception circuit of a power supply system. A power supply system is provided which includes a power supply device equipped with a power supply coil, and a power reception device equipped with a power reception coil. When a resonance circuit is in a resonance state, a peak voltage value of a voltage generated in the power reception coil is set higher than a prescribed voltage value. When the resonance circuit is in a non-resonance state, the peak voltage value of the voltage generated in the power reception coil is set lower than the prescribed voltage value.

2 Claims, 5 Drawing Sheets

(56) References Cited

U.S. PATENT DOCUMENTS

2015/0194815 A1* 7/2015 Rofe ..................... H02J 50/12
   307/104
2016/0261145 A1* 9/2016 Kinoshita ............... H02J 17/00
2016/0301320 A1* 10/2016 Wakabayashi .... H02M 3/33569
2016/0365231 A1* 12/2016 Xu ..................... H01J 49/0063

* cited by examiner

POWER SUPPLY SYSTEM

RELATED APPLICATIONS

This application claims priority under 35 U.S.C. § 119 to Japanese Patent Application No. 2015-107604 filed on May 27, 2015, the entire content of which is hereby incorporated by reference.

BACKGROUND OF THE INVENTION

Field of the Invention

The present invention relates to a power supply system.

Background Art

There has recently been known a power supply system which supplies power wirelessly by electromagnetic induction of a power supply coil and a power reception coil or electromagnetic coupling (refer to, for example, Patent Document 1). This power supply system has been used to charge a battery provided in an electronic device such as a cellular phone, a PDA (Personal Digital Assistant) or the like.

In the power supply system, the power supply coil provided in a power supply device, and the power reception coil provided in a power reception device are arranged opposite to each other. A current is made to flow through the power supply coil to thereby generate an induced current in the power reception coil, whereby power can be supplied to the power reception device.

[Patent Document 1] Japanese Patent Application Laid-Open No. 2014-131440

SUMMARY OF THE INVENTION

A problem may however arise in that when, for example, a rechargeable battery is charged by the power supply system which supplies power from the power supply coil to the power reception coil by such electromagnetic induction as seen in Patent Document 1, an overvoltage is applied to the rechargeable battery around when the charging is completed, i.e., in a state in which the load is lightened.

In order to solve the above problem, there is provided a power supply system according to the present invention, which includes a power supply device and a power reception device and supplies power from the power supply device to the power reception device. In the power supply system, the power supply device is equipped with a power supply coil. The power reception device is equipped with a resonance circuit having a power reception coil fed with the power from the power supply coil, a resonance capacitor which resonates with the power reception coil, and a switching element which changes an electrical connection state of the resonance capacitor to control a resonance state of the resonance circuit, a rectifying circuit which rectifies and smooths an AC output voltage generated in the resonance circuit to obtain DC power, and a load supplied with the DC power obtained from the rectifying circuit. When the resonance circuit is in the resonance state, a peak voltage value of a voltage generated in the power reception coil is set higher than a prescribed voltage value. When the resonance circuit is in a non-resonance state, the peak voltage value of the voltage generated in the power reception coil is set lower than the prescribed voltage value.

According to the present invention, since the peak voltage value of the voltage generated in the power reception coil is set lower than the prescribed voltage value when in the non-resonance state, it is possible to prevent an overvoltage from being applied to the load.

DETAILED DESCRIPTION OF THE PREFERRED EMBODIMENTS

The background led to the assumption of the present invention by the present inventors will first be described before the description of embodiments of the present invention.

Figure 1:
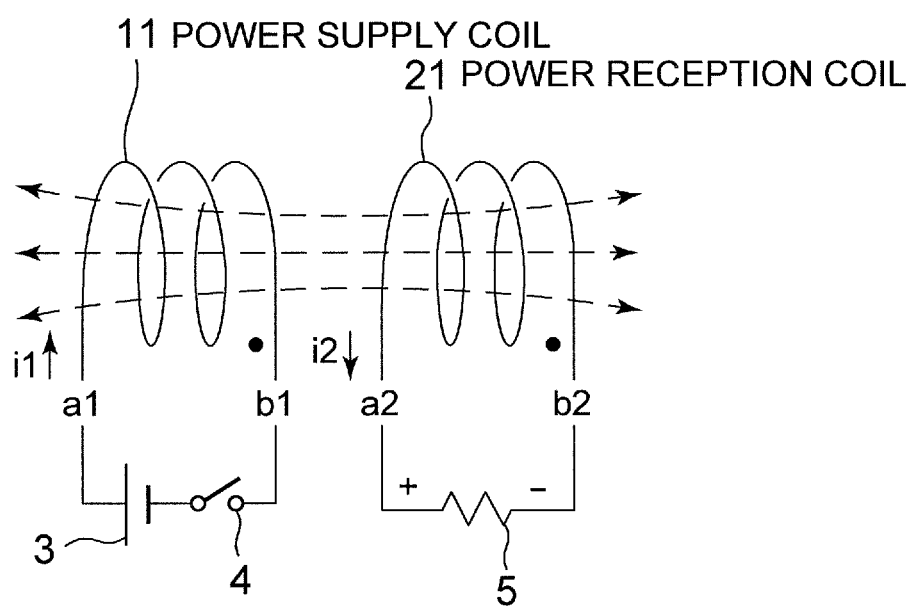
FIG. 1 is a diagram for describing the polarity of a voltage generated in a power reception coil when a voltage is applied to a power supply coil.

FIG. 1 shows the orientation of an induced current which appears in a power reception coil 21 where the central axes of a power supply coil 11 and the power reception coil 21 wound in the same direction are superposed on each other and a DC current is applied to the power supply coil 11.

A DC power supply 3 and a switch 4 are connected in series with the power supply coil 11. A load 5 is connected to the power reception coil 21.

When the switch 4 is connected, the DC current is applied between terminals a1 and b1 of the power supply coil 11, so that current flows from the terminal a1 of the power supply coil 11 to the terminal b1 thereof, i.e., in the direction of i1. At that time, the power reception coil 21 receives a generated magnetic field therein, so that current flows therethrough in the direction of i2. Although the load resistor is connected between terminals a2 and b2, a positive polarity voltage is generated at the terminal a2 and a negative polarity voltage is generated at the terminal b2 in this case.

Figure 2:
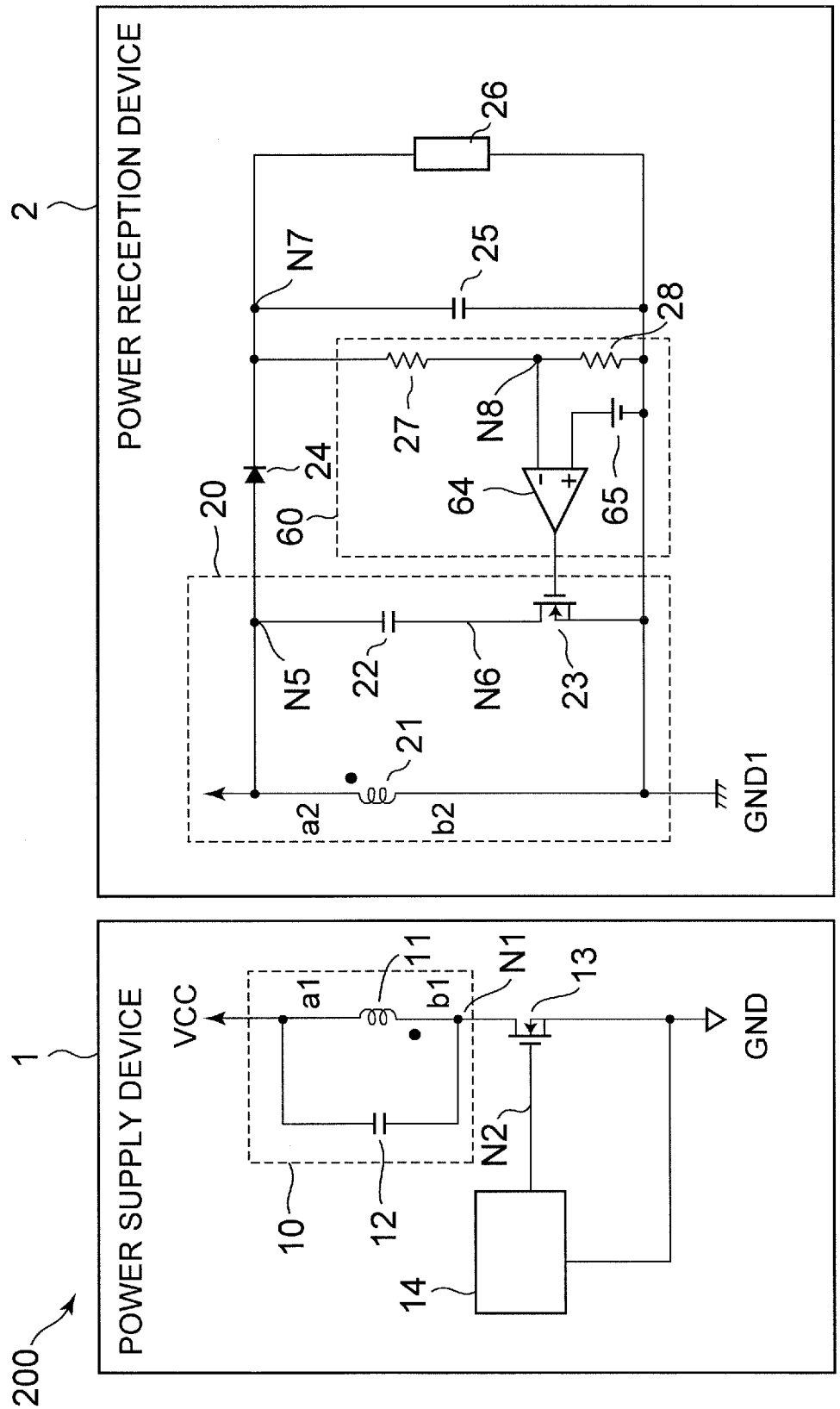
FIG. 2 is a block diagram illustrating a power feeding system according to a reference example.

FIG. 2 is a block diagram illustrating a power supply system 200 according to a reference example. FIG. 2 illustrates a circuit configuration of the power supply system 200 invented by the present inventors.

The power supply system 200 is equipped with a power supply device 1 and a power reception device 2.

The power supply system 200 is a system which supplies power from the power supply device 1 to the power reception device 2 wirelessly (contactlessly). The power supply system 200 supplies the power supplied from the power supply device 1 to the power reception device 2 to a load 26 provided in the power reception device 2. The power reception device 2 is, for example, an electronic device such as a cellular phone terminal, a PDA or the like. The power supply device 1 is, for example, a charger corresponding to the power reception device 2.

The power supply device 1 is equipped with a power supply coil 11, a resonance capacitor 12, a drive transistor 13, and an oscillation circuit 14.

The power supply coil 11 has a terminal a1 connected to a power supply VCC, and a terminal b1 connected to a node N1. The power supply coil 11 is, for example, a coil which supplies power to the power reception coil 21 provided in the power reception device by electromagnetic induction or electromagnetic coupling.

The resonance capacitor 12 is a capacitor which is connected in parallel with the power supply coil 11 and resonates with the power supply coil 11. Here, the power supply coil 11 and the resonance capacitor 12 configure a resonance circuit 10. The resonance circuit 10 resonates at a prescribed resonance frequency (e.g., 100 kHz) determined by the inductance value of the power supply coil 11 and the capacitance value of the resonance capacitor 12.

The drive transistor 13 is connected in series with the resonance circuit 10. The present embodiment will describe, as one example, where the drive transistor 13 is an NMOS transistor.

The drive transistor 13 has a source terminal grounded to a power supply GND, a gate terminal connected to an output signal line (node N2) of the oscillation circuit 14, and a drain terminal connected to the node N1. The oscillation circuit 14 outputs a control signal having an H state and an L state repeated according to a prescribed cycle. The drive transistor 13 periodically repeats an ON state (electrically conductive state) and an OFF state (electrically non-conductive state) according to the output of the oscillation circuit 14. Thus, a periodic signal is generated in the power supply coil 11, so that power is supplied from the power supply coil 11 to the power reception coil 21 by electromagnetic induction.

The power reception device 2 is equipped with a power reception coil 21, a resonance capacitor 22, a resonance control transistor 23, a rectifying diode (rectifying circuit) 24, a smoothing capacitor 25, a load 26, and a resonance controller 60.

The power reception coil 21 has a terminal a2 connected to a node N5, and a terminal b2 connected to a power supply GND1. The power reception coil 21 is, for example, a coil fed with power from the power supply coil 11 provided in the power supply device 1 by electromagnetic induction or electromagnetic coupling. The power reception coil 21 is arranged opposite to the power supply coil 11 in such a manner that the winding direction thereof becomes the same as that of the power supply coil 11 in a manner similar to the power supply coil 11 and the power reception coil 21 both illustrated in FIG. 1 when power is supplied to the load 26 of the power reception device.

The resonance capacitor 22 is a capacitor connected in parallel with the power reception coil 21 and resonates with the power reception coil 21. The resonance capacitor 22 is connected between the node N5 and a node N6. Here, the power reception coil 21 and the resonance capacitor 22 configure a resonance circuit 20. The resonance circuit 20 resonates at a prescribed resonance frequency (e.g., 100 kHz) determined by the inductance value of the power reception coil 21 and the capacitance value of the resonance capacitor 22. Incidentally, in the present embodiment, the resonance frequency of the power reception device 2 and the resonance frequency of the power supply device 1 are equal to each other and are, for example, 100 kHz.

The resonance circuit 20 is further equipped with a resonance control transistor 23 (switching element) connected in parallel with the power reception coil 21 together with the resonance capacitor 22 and connected in series with the resonance capacitor 22. The resonance control transistor 23 is, for example, an NMOS transistor which has a source terminal connected to the power supply GND1, and a drain terminal connected to the node N6. Also, the resonance control transistor 23 has a gate terminal connected to an output signal line extending from the resonance controller 60 to be described later. The resonance control transistor 23 is brought to an ON state by the resonance controller 60 to thereby allow the resonance capacitor 22 to function and cause the resonance circuit 20 to generate resonance. Further, the resonance control transistor 23 is brought to an OFF state by the resonance controller 60 to thereby electrically disconnect the resonance capacitor 22 and stop the resonance of the resonance circuit 20.

The rectifying diode 24 (rectifying circuit) has an anode terminal connected to the node N5 being one end of the power reception coil 21, and a cathode terminal connected to a node N7 being one end of the smoothing capacitor 25. The rectifying diode 24 rectifies the power received by the power reception coil 21 and converts the same into DC power. That is, the rectifying diode 24 converts AC power (AC voltage) generated in the power reception coil 21 into DC power (DC voltage).

The smoothing capacitor 25 smooths the DC power converted by the rectifying diode 24.

Further, the load 26 is connected in parallel with the smoothing capacitor 25.

The resonance controller 60 is a resonance controller which controls the resonance control transistor 23 to thereby control a resonance state of the resonance circuit 20. The resonance controller 60 controls the resonance control transistor 23 according to the DC voltage obtained by rectifying the power received by the power reception coil 21. The resonance controller 60 is equipped with resistors 27 and 28, a comparator 64, and a reference power supply 65. The comparator 64 has a + input terminal connected to the reference power supply 65, and a − input terminal connected to a node N8.

One end of the resistor 27 is connected to the node N7. The comparator 64 compares a voltage divided to the node N8, which is obtained by dividing the voltage of the node N7 by the resistors 27 and 28, and an output voltage of the reference power supply 65. Thus, when the converted voltage is greater than or equal to the output voltage of the reference power supply 65, the comparator 64 brings the resonance control transistor 23 to an OFF state.

Specifically, when the voltage of the node N8 divided by the resistors 27 and 28 is lower than a prescribed threshold voltage, the comparator 64 outputs an H state to its output terminal. Further, when the voltage of the node N8 divided by the resistors 27 and 28 is greater than or equal to the prescribed threshold voltage, the comparator 64 outputs an L state to its output terminal.

Thus, the resonance controller 60 controls the resonance control transistor 23 according to the post-rectification voltage at the node N7 to change the state of resonance of the resonance circuit 20.

A power reception circuit capable of obtaining an output made into a constant voltage at the node N7 is configured in this manner.

The reference power supply 65 is a constant voltage source which outputs a prescribed threshold voltage corresponding to the prescribed threshold voltage. A constant voltage value of the node N7 is determined by the configuration of the reference power supply 65 and the resistors 27 and 28.

Figure 3:
FIG. 3 is a diagram for describing a voltage waveform generated in a power supply coil of a power supply device in a first embodiment.

FIG. 3 illustrates the behavior of the voltage of the terminal b1 of the power supply coil 11 in the power supply device 1 illustrated in FIG. 2.

As described above, the oscillation circuit 14 outputs the control signal for bringing the drive transistor 13 to the ON state (electrically conductive state) and the OFF state (electrically non-conductive state) in accordance with the prescribed cycle. Therefore, in the resonance circuit 10 comprised of the power supply coil 11 and the resonance capacitor 12, when the drive transistor 13 is in the ON state, the power supply current flows through the power supply coil 11, and the power supply voltage is applied to the resonance capacitor 12. At this time, the terminal b1 of the power supply coil 11 becomes approximately the GND potential.

When the drive transistor 13 is in the OFF state, the resonance circuit 10 comprised of the power supply coil 11 and the resonance capacitor 12 becomes an oscillation state. Consequently, the voltage is generated in a positive polarity at the terminal b1 of the power supply coil 11 so as to draw an arc.

Since the oscillation circuit 14 repeats output according to the prescribed cycle, the resonance circuit 10 comprised of the power supply coil 11 and the resonance capacitor 12 performs the supply of power from the power supply and repetition of the oscillation state. Therefore, such a repetition waveform as illustrated in FIG. 3 is observed at the terminal b1 of the power supply coil 11.

The cycle of ON and OFF of the oscillation circuit 14 may be based on the time set in advance or may be based on such a timer operation as to turn it on at a timing in which the voltage of the terminal b1 of the power supply coil 11 draws the arc in the positive polarity and is returned to 0V again, 0V switching, or the like.

Figure 4:
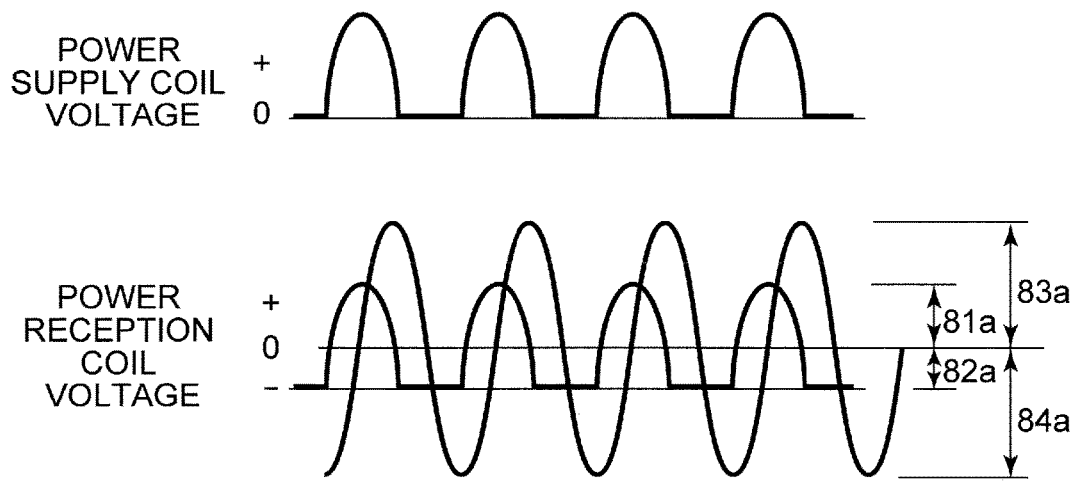
FIG. 4 is a diagram for describing voltage waveforms generated in a power supply coil of a power supply device in FIG. 2, and a power reception coil when a rectifying diode is disconnected.

FIG. 4 illustrates voltages which appear in the power supply coil 11 and the power reception coil 21 in the power supply system 200 illustrated in FIG. 2. However, in order to make it easy to understand their description, FIG. 4 illustrates a result obtained by disconnecting the rectifying diode 24 of the power reception device 2 in FIG. 2 and observing the voltage (voltage at the node N5) of the terminal a2 of the power reception coil 21 as the voltage of the power reception coil 21.

A periodic waveform similar to that of FIG. 3 is assumed to have occurred in the power supply coil 11. At this time, a positive/negative voltage appears in the power reception coil 21.

In a "non-resonance state" in which in the resonance circuit 20 of the power reception device 21 illustrated in FIG. 2, the resonance control transistor 23 is turned OFF to disconnect the resonance capacitor 22 from the power reception coil, the voltage waveform of the power reception coil 21 becomes a small amplitude whose positive/negative peak voltages are from 81a to 82a, having a shape analogous to the voltage waveform of the power supply coil 11. Such a waveform as to draw an arc appears on the positive side and a waveform having a flat portion at its peak portion appears on the negative side.

In a "resonance state" in which in the resonance circuit 20 of the power reception device 21, the resonance control transistor 23 is turned ON to connect the resonance capacitor 22 to the power reception coil 21, the voltage waveform of the power reception coil 21 becomes a large amplitude whose positive/negative peak voltages at the terminal a2 of the power reception coil are from 83a to 84a. In the resonance state, the voltage waveform of the power reception coil 21 is formed so as to draw an arc positively and negatively.

Incidentally, in the "resonance state", the voltage of the power supply coil 11 and the voltage of the power supply coil 21 are shifted in phase. This is because phase rotation due to the connection of the resonance capacitor 22 to the power reception coil 21 occurs.

Figure 5:
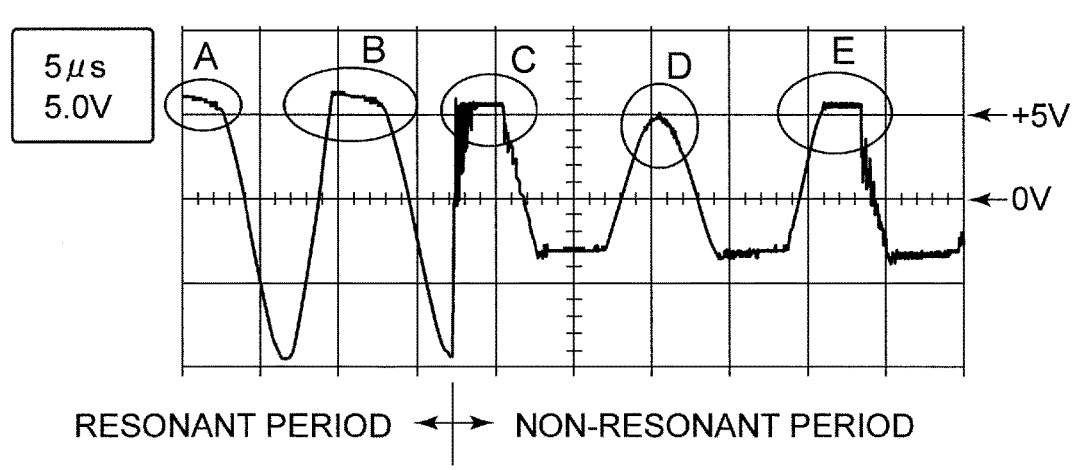
FIG. 5 is a diagram for describing a voltage waveform generated in the power reception coil of the power supply device in FIG. 2.

FIG. 5 illustrates a result obtained by measuring a voltage which appears at the terminal a2 of the power reception coil 21 when the power supply system 200 is operated in the state in which the rectifying diode 24 of the power reception device 2 is connected as illustrated in FIG. 2. FIG. 5 represents the manner in which the resonance circuit 20 of the power reception device 2 is transitioned from the "resonance state" to the "non-resonance state".

Portions A and B in FIG. 5 are peak voltage portions of the power reception coil 21 during a period in which the voltage of the load 26 in the power reception device 2 is dropped, so that the resonance controller 60 detects that the voltage of the node N7 is made lower than +5V, thereby turning ON the resonance control transistor 23. The resonance circuit 20 is in the "resonance state".

The reason why the peak portions of the power reception coil 21, which are placed in the "resonance state" and where the arcs are to be drawn, have been collapsed is that since the smoothing capacitor 25 maintains its voltage at an approximately +5V, current that tried to go beyond a forward voltage of the rectifying diode 25 flows into the smoothing capacitor 25, so that each peak voltage of the power reception coil 21 is limited by the sum of the output voltage (+5V) and the forward voltage of the rectifying diode.

Portions C, D and E in FIG. 5 are peak voltage portions of the power reception coil 21 during a period in which the voltage of the load 26 in the power reception device 2 is raised, so that the resonance controller 60 detects that the voltage of the node N7 is made higher than +5V, thereby turning OFF the resonance control transistor 23. The resonance circuit 20 is in the "non-resonance state".

It turned out that although the peak voltage of the power reception coil 21 should be made lower than +5V as illustrated in D of FIG. 5 in the "non-resonance state", it may be higher than +5V as designated at each of C and E in FIG. 5.

Doing so results in a problem that since power is continuously supplied to the load 26 even in the non-resonance state, the voltage applied across the load becomes higher than a target value in a state in which the load is lightened.

Incidentally, since the peak voltage of the power reception coil 21 is limited by the sum of the voltages of the smoothing capacitor 25 and the rectifying diode 24 in a manner similar to the "resonance state" even in the "non-resonance state", the portions C and E illustrated in FIG. 5 become collapsed peak voltage portions. Since, however, the collapsed peak portions exceed +5V and assume waveforms approximately similar to the waveforms designated at A and B of FIG. 5 in the substantially resonance state, so that the resonance state and the non-resonance state cannot be distinguished.

Thus, for example, in such an application as to use a rechargeable battery for the load 26 and charge it by the power supply system, a problem arises in that an overvoltage is applied to the rechargeable battery in a state in which the load at around the end of charging of the rechargeable battery is lightened.

Further, such a state is easy to occur particularly when the distance between the coils is small, or when a load current becomes less when the power reception side tries to receive power ranging from large to small power.

Accordingly, the present invention provides a power supply system capable of solving such problems.

Figure 6:
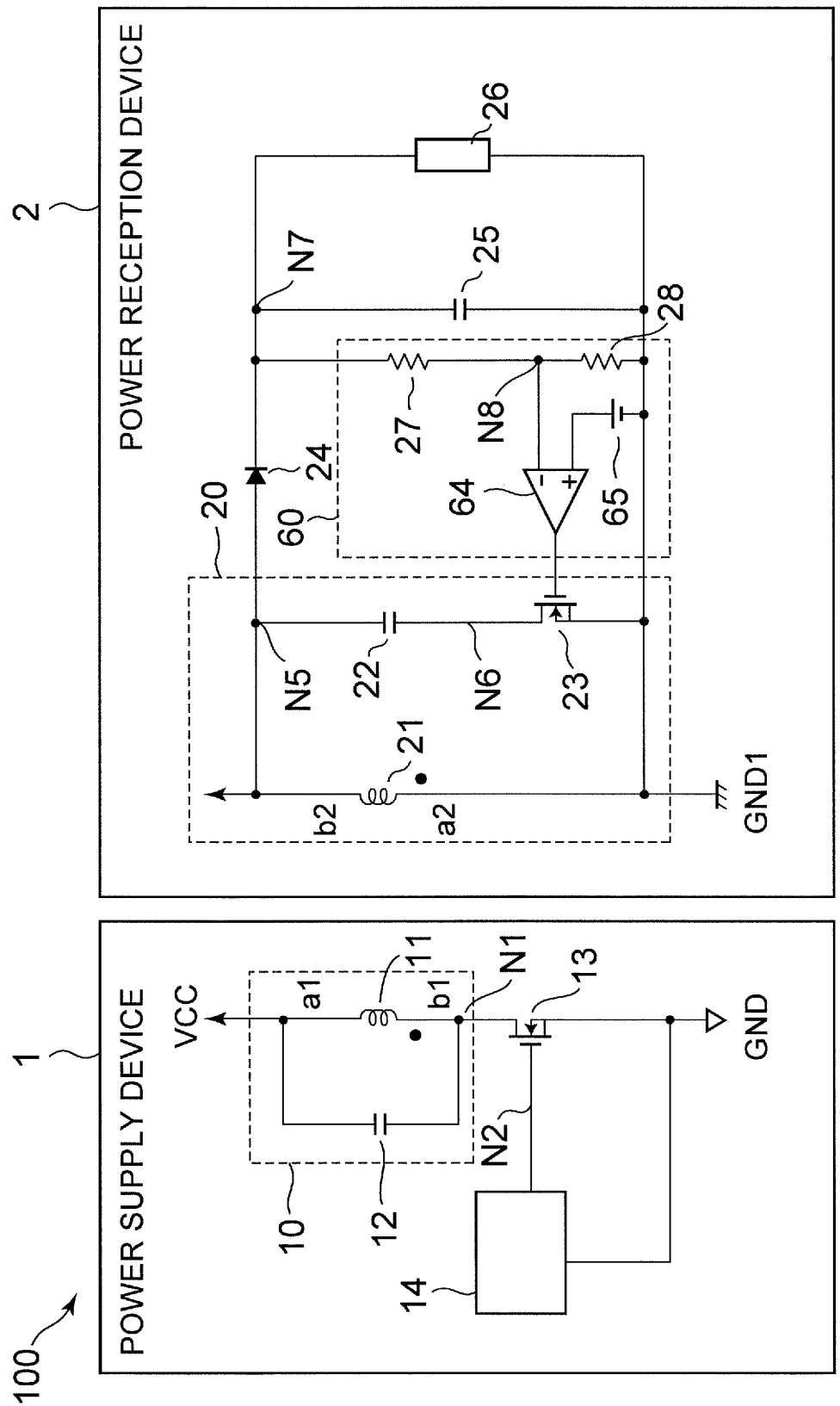
FIG. 6 is a block diagram illustrating one example of a power supply system according to an embodiment of the present invention.

FIG. 6 is a block diagram illustrating one example of a power supply system according to an embodiment of the present invention.

In FIG. 6, components similar to those in the reference example illustrated in FIG. 2 are identified by the same reference numerals, and their description will therefore be omitted.

In the power supply system 100 according to the present embodiment, as illustrated in FIG. 6, the connection of the power supply coil 11 is made similar to the power supply system 200 illustrated in FIG. 2, and the polarity of the power reception coil 21 of the power reception device 2 is made opposite to that of the power supply system 200.

That is, the terminal a2 of the power reception coil 21 is connected to GND, and the terminal b2 thereof is connected to the node N5.

Since the power supply device 1 is similar in operation to that of the power supply system 200 of FIG. 2, and the waveform of a voltage generated in the power supply coil 11 is similar to that illustrated in FIG. 3, their description will be omitted.

Figure 7:
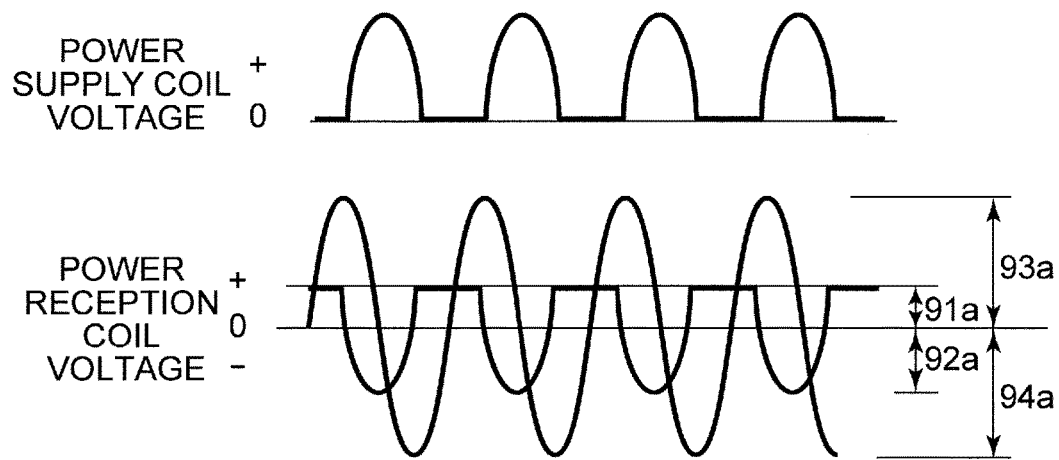
FIG. 7 is a diagram for describing voltage waveforms generated in a power supply coil of a power supply device in FIG. 6 and a power reception coil when a rectifying diode is disconnected.

FIG. 7 illustrates voltages which appear in the power supply coil 11 and the power reception coil 21 in the power supply system 100 illustrated in FIG. 6. However, in order to make it easy to understand their description, FIG. 7 illustrates a result obtained by disconnecting the rectifying diode 24 of the power reception device 2 in FIG. 6 and observing the voltage of the terminal b2 of the power reception coil 21, i.e., the voltage of the node N5 as the terminal voltage of the power reception coil 21.

It is possible to confirm that the positive and negative amplitudes of the voltage of the terminal b2 of the power reception coil 21 are opposite in direction to those in FIG. 4.

In a "non-resonance state" in which the resonance control transistor 23 of the power reception device 2 in FIG. 6 is turned OFF to disconnect the resonance capacitor 22 from the power reception coil 21, the voltage waveform of the power reception coil 21 becomes a small amplitude whose positive/negative peak voltages in the power reception coil 21 are from 91a to 92a. FIG. 7 is different from FIG. 4 in that a waveform having a flat portion at its peak portion appears on the positive side, and such a waveform as to draw an arc appears on the negative side.

That is, such an amplitude waveform that the peak value becomes flat on the positive side and the arc is drawn on the negative side appears.

In a "resonance state" in which the resonance control transistor 23 is turned ON to connect the resonance capacitor 22 to the power reception coil 21, the voltage waveform of the power reception coil 21 becomes a large amplitude whose positive/negative peak voltages in the power reception coil 21 are from 93a to 94a. In the "resonance state", the power reception coil 21 is operated so as to draw an arc positively and negatively.

Figure 8:
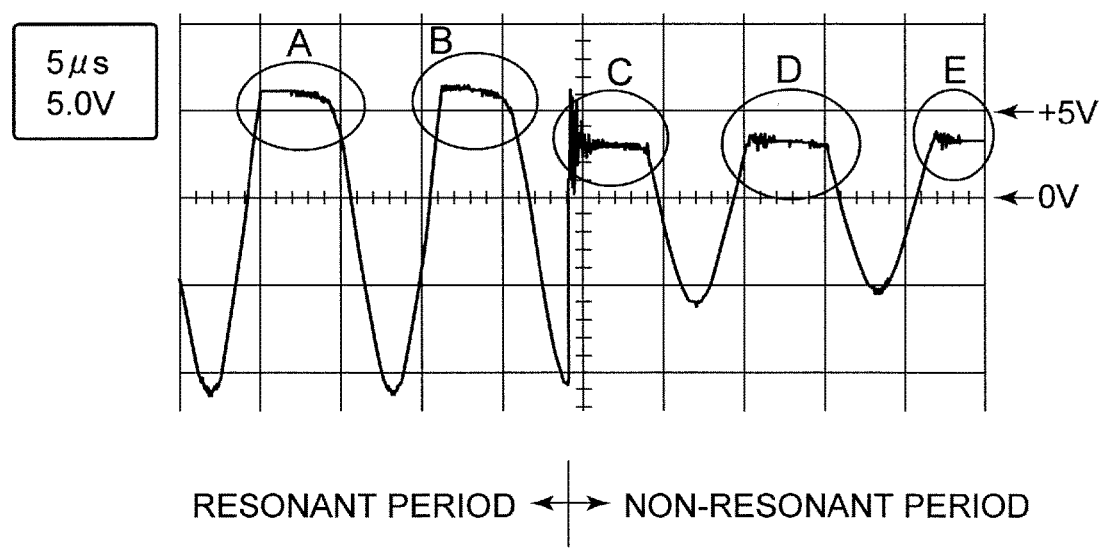
FIG. 8 is a diagram for describing a voltage waveform generated in the power reception coil of the power supply device in FIG. 6.

FIG. 8 illustrates a result obtained by measuring a voltage which appears at the terminal b2 of the power reception coil 21 when the power supply system 100 is operated in the state in which the rectifying diode 24 of the power reception device 2 is connected as illustrated in FIG. 6. FIG. 8 represents the manner in which the resonance circuit 20 of the power reception device 2 is transitioned from the "resonance state" to the "non-resonance state".

Portions A and B in FIG. 8 are peak voltage portions of the power reception coil 21 during a period in which the voltage of the load 26 in the power reception device 2 is dropped, so that the resonance controller 60 detects that the voltage of the node N7 is made lower than +5V, thereby turning ON the resonance control transistor 23. These peak voltages exceed +5V (prescribed voltage value), and the resonance circuit 20 is in the "resonance state".

The reason why the peak portions of the voltage waveform of the power reception coil 21, which are placed in the "resonance state" and where the arcs are to be drawn, are collapsed so as to have flat portion is that in a manner similar to the power supply system illustrated in FIG. 2, the upper limit value of each peak voltage of the power reception coil 21 is limited by the sum of the output voltage (+5V) and the forward voltage of the rectifying diode 24.

Portions C, D and E in FIG. 8 are peak voltage portions of the power reception coil 21 during a period in which the voltage of the load 26 in the power reception device 2 is increased, so that the resonance controller 60 detects that the voltage of the node N7 is made higher than +5V, thereby turning OFF the resonance control transistor 23. The resonance circuit 20 is in the "non-resonance state".

As designated at C, D and E in FIG. 8, the peak voltages of the power reception coil 21 in the "non-resonance state" are less than +5V. This is because since the power reception coil 21 is made opposite in direction to that illustrated in FIG. 2, the waveform of the voltage generated in the power reception coil 21 has a flat portion at each peak value thereof, so that its peak voltage value can reliably be made lower than +5V (prescribed voltage value).

Although the power is continuously supplied to the load 26 even in the "non-resonance state" in the state illustrated in FIG. 5, each peak voltage of the power reception coil 21 is less than +5V in the state illustrated in FIG. 8. Therefore, the power supplied to the load 26 becomes zero, thereby making it possible to prevent an overvoltage from being applied to the load 26.

Thus, the voltage applied to the load 26 can accurately be controlled over a wide range in which the load 26 changes from a lightly loaded state to a heavily loaded state.

As described above, according to the power supply system of the present embodiment, since it is possible to control the charging current up to reaching zero even when there is a demand for a wide range of load current as in the case of battery charging, the normal charging operation is made possible from the charging star time when more charging current is required, to near the charging completion at which the charging current becomes very small.

Although the embodiments of the present invention have been described above, the present invention is not limited to the embodiments. It is needless to say that various changes can be made thereto within the scope not departing from the gist of the present invention.

For example, in the above embodiment, the peak voltage of the power reception coil 21 is set so as not to exceed the prescribed potential during resonance by the method of reversing the directions of the power supply coil 11 and the power reception coil 21 to each other, but not limited to it. It is also possible to use methods such as limiting the distance between the coils, applying a limit on the load current, etc.

Also, the load 26 in the above embodiment may either be a resistance load or a load having a variation in impedance. In addition, the load 26 may be a power supply of a system using a microcomputer, an audio amplifier, a wireless circuit, a sensor circuit, an illumination driving circuit, a display circuit, etc., or a circuit for charging a battery.

Further, although the diode is used as the rectifying circuit in the above embodiment, a synchronous rectifying circuit using an FET may be used. If the synchronous rectifying circuit is used, a power reception circuit low in heat loss can be configured.

What is claimed is:

1. A power supply system comprising:
a power supply device and a power reception device, the power supply system supplying power from the power supply device to the power reception device,
wherein the power supply device includes a power supply coil, and
wherein the power reception device includes:
   a resonance circuit having a power reception coil fed with the power from the power supply coil;
   a resonance capacitor that resonates with the power reception coil;
   a switching element that changes an electrical connection state of the resonance capacitor to control a resonance state of the resonance circuit; and
   a rectifying circuit that rectifies and smooths an AC output voltage generated in the resonance circuit to obtain DC power, and a load supplied with the DC power obtained from the rectifying circuit,
wherein the switching element is controlled by a resonance control circuit including a reference power supply and a comparator connected to the switching element, the comparator controlling the switching element depending upon a divided voltage from the resonance circuit and a reference voltage from the reference power supply,
such that when the resonance circuit is in the resonance state, the switching element is in an ON state and a peak voltage value of a voltage generated in the power reception coil is set higher than a prescribed voltage value, and
wherein when the resonance circuit is in a non-resonance state, the switching element is in an OFF state and the peak voltage value of the voltage generated in the power reception coil is set lower than the prescribed voltage value.

2. The power supply system according to claim 1, wherein when the resonance circuit is in the non-resonance state, a peak portion of the voltage generated in the power reception coil is driven to be a voltage waveform having a flat portion.

* * * * *